United States Patent [19]

Korr et al.

[11] 4,159,629

[45] Jul. 3, 1979

[54] APPARATUS FOR THE COLLECTION AND CONVERSION OF SOLAR ENERGY

[75] Inventors: Abraham L. Korr, Philadelphia, Pa.; Evan H. Walker, Aberdeen, Md.; Bernard T. Svihel, Laverock, Pa.

[73] Assignee: A. L. Korr Associates, Inc., Philadelphia, Pa.

[21] Appl. No.: 783,069

[22] Filed: Mar. 30, 1977

[51] Int. Cl.² ............................. F03G 7/02; F24J 3/02
[52] U.S. Cl. ..................................... 60/641; 126/271
[58] Field of Search ................ 203/DIG. 1; 126/271; 60/641; 137/561, 565

[56] References Cited

U.S. PATENT DOCUMENTS

| 3,893,443 | 7/1975 | Smith | 126/271 |
| 3,985,119 | 10/1976 | Oakes, Jr. | 126/271 |
| 4,055,161 | 10/1977 | Jones | 126/271 |

FOREIGN PATENT DOCUMENTS 2508767  9/1976  Fed. Rep. of Germany ........... 126/271

*Primary Examiner*—Allen M. Ostrager
*Attorney, Agent, or Firm*—Howson and Howson

[57] ABSTRACT

Solar energy is collected by an array of parallel trough-like reflectors of paraboloidal cross-section, and concentrated upon radiation-absorbent pipes positioned along the lines of focus of the reflectors. The array is mounted on a boat which floats on an irrigation pond of a farm and is rotated by a clock-like drive mechanism so as to follow or track the daily east-west motion of the sun, thereby maintaining the concentration of solar radiation upon the pipes. The flotation of the array by means of the boat permits the use of very low drive power for rotating it to track the sun, and also shields the underlying water from the air and sun so as to reduce evaporation thereof. A central column stabilizes the position of the boat with respect to lateral drift or angular tilt, while permitting vertical motion of the boat in response to changes in pond level; the array may therefor be protected from heavy wind by dropping the pond level so that the array is protected by the sidewalls of the pond at such times. A rotating joint arrangement permits circulation of a heat-absorbent fluid such as water (steam) between the radiation-absorbent pipes and a location adjacent the pond where the developed heat is utilized.

22 Claims, 8 Drawing Figures

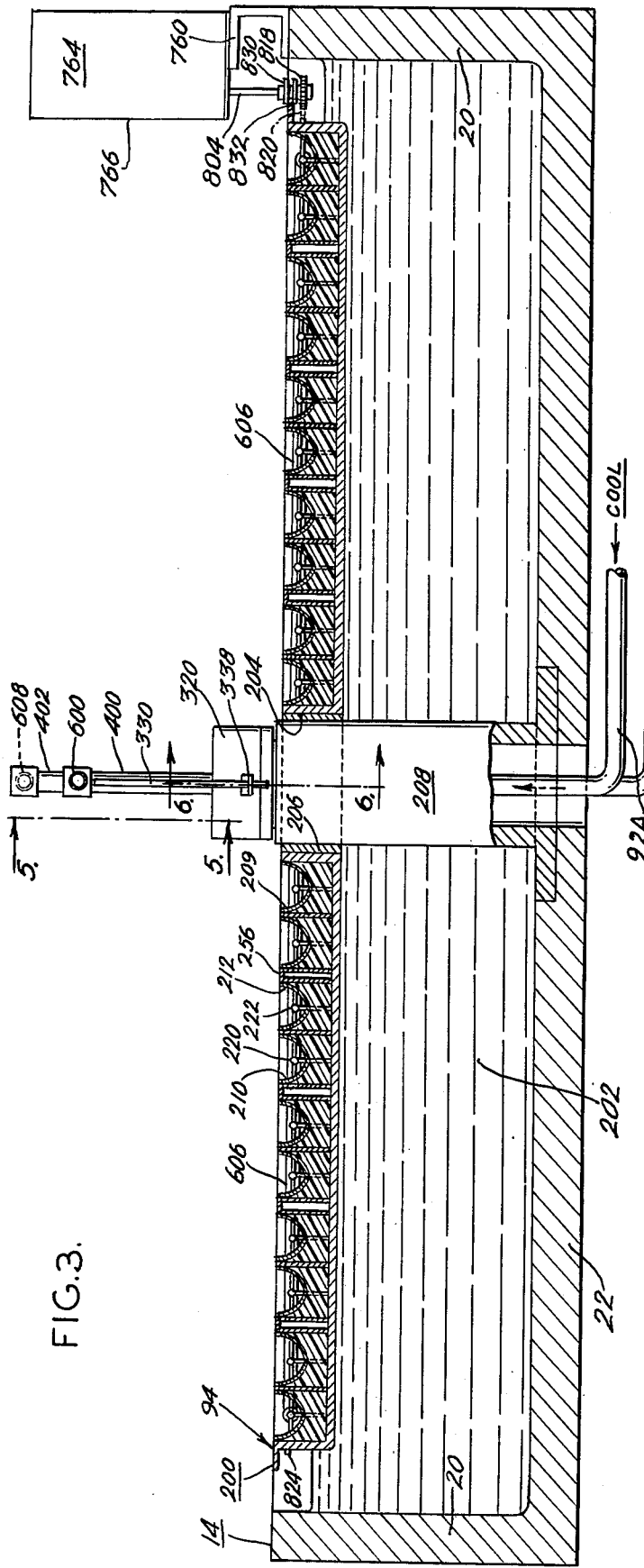
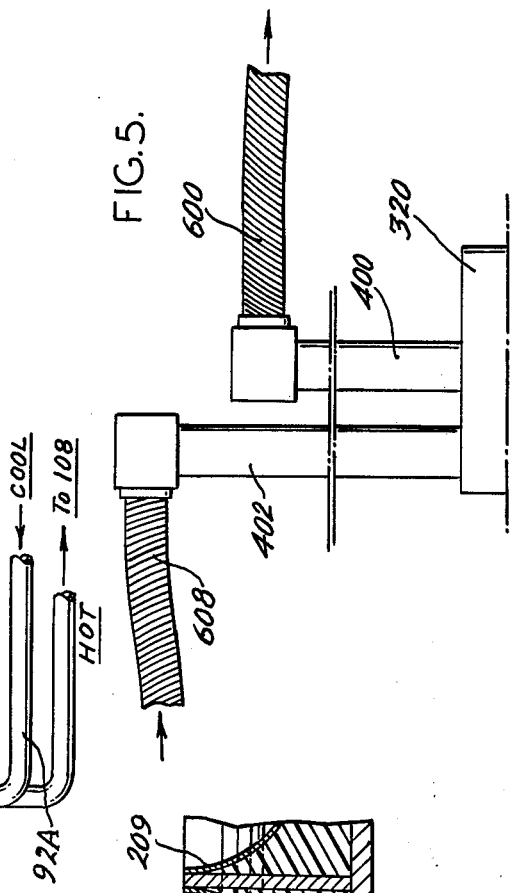
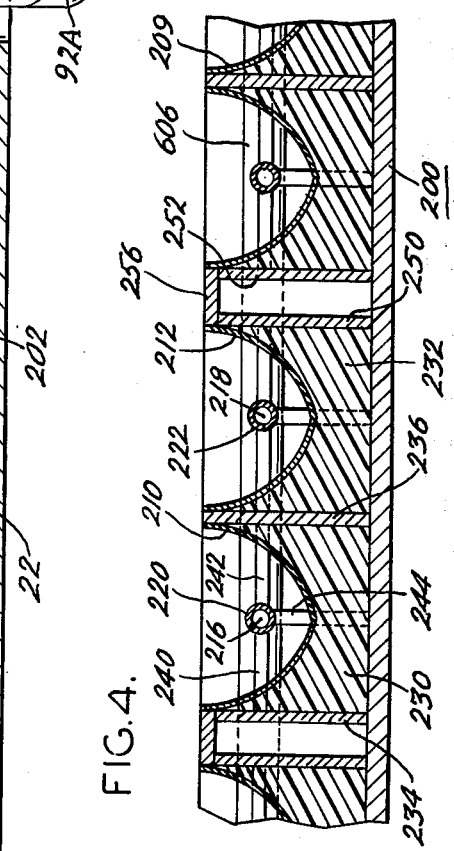

APPARATUS FOR THE COLLECTION AND CONVERSION OF SOLAR ENERGY

BACKGROUND OF THE INVENTION

This invention relates to apparatus for the collection and conversion of solar energy.

The possibility of utilizing solar energy as a direct source of useful thermal energy has long been appreciated, but for the most part has resisted efforts at practical exploitation in many applications. Of course, merely by its shining upon the earth the sun produces a warming effect, and the rate of delivery of calories from the sun to the earth on a bright day is very great. However, the heating is distributed over such a large area that the temperature rise produced in the irradiated area is only moderate. For many important purposes what is needed is a very high temperature, e.g. 600° to 1500° K. are desired to operate turbines or heat engines, for example. For such purposes then, the heat produced by solar radiation must be concentrated at its intended place of use in order to produce the necessary high temperatures.

The basic principles for accomplishing this are well known; solar radiation is focused or concentrated upon one or more radiation-absorbing elements which absorb a substantial fraction of the incident solar energy and convert it into thermal energy at high temperatures, which thermal energy can then be used for many utilitarian purposes. It is also known to accomplish transfer of the thermal energy from the radiation-absorbing cite to the place of utilization by means of a circulating heat-absorbing fluid. The high temperature of the heat-absorbing fluid may then be used as the source of energy for producing useful work, for example to drive an engine and thus produce useful mechanical work, or to drive a turbine-generator and thus produce useful electrical energy.

It has been proposed to utilize as the radiation-concentrating system a large-area array of spaced-apart flat reflectors supported on the ground about the foot of a tower having a radiation absorber at its top, onto which absorber solar radiation is directed by each appropriately-oriented reflector. However, as the sun executes its daily apparent motion in the sky, the angular orientation of each of the many reflectors must be individually and differently controlled about two axes, and with a high degree of accuracy, a requirement which results in high expense and complexity of the control system. Also, the reflectors themselves must be very accurately configured to assure accurate reflection of radiations onto the remote radiation absorber on the tower. The reflectors must also be spaced apart sufficiently that they do not shade each other for any useful position of the sun, which reduces the effective density of area coverage by the reflectors. Both the reflectors and the tower assembly also present problems of support against wind loads, since wind peaks of 100 m.p.h. must often be accommodated by the support design. Accordingly, while the tower system has some inherent advantages, it also has substantial inherent drawbacks, including those mentioned above.

It has also been proposed to achieve the desired radiation concentration by using one or more trough-like reflectors of paraboloid cross-section, with a liquid-containing radiation-absorbent conduit extending along the line focus of the reflector. Each reflector is rotated about its line focus so as to track the east-west motion of the sun. While perhaps satisfactory for some smaller-scale applications, the system requires individual drives for rotating the reflectors, with some attendant complexity. Also, land covered by the reflectors is no longer available for other uses such as farming.

Thus while these and many other expedients are well known in the prior art, and most are effective to produce some degree of useful heating in response to solar energy, the problem has really been how to collect and transfer the solar energy with minimum cost, least use of land area, and the highest degree of reliability in the particular application involved. Thus the problem is essentially an economic one and, in general, wide usage of solar radiation as a practical source of energy has not come into general usage because of limitations on the practicality of the arrangements thus far known.

One particular possible field of application of solar energy is in those geographic areas, for example the southwest region of the United States, where large-scale irrigation of the land is necessary for plant and/or animal farming. This irrigation process requires large quantities of energy to accomplish the necessary pumping of water; in view of the present and contemplated relative shortage of conventional energy sources such as fossil fuels or electricity, as well as the expense of such fuels, continuance of necessary farm irrigation presents serious problems which are expected to become even more serious in the future.

While the present invention will be described with particular respect to its application in providing energy in suitable form for accomplishing pumping in farm irrigation, it provides improvements which have wide application entirely outside the field of irrigation pumping or the like.

It is therefore an object of the present invention to provide a new and useful method and apparatus for the collection and conversion of solar energy.

Another object is to provide such collection and conversion in a manner which is highly practical, particularly from the viewpoints of cost, reliability and area of land-use required.

Another object is to provide such a method and apparatus which is especially applicable to providing energy in areas utilizing irrigation, and which simultaneously assists in minimizing irrigation water losses through evaporation.

BRIEF SUMMARY OF THE INVENTION

These and other objects of the invention are achieved by the provision of apparatus for the collection and conversion of solar energy, comprising an array of radiation-concentrating elements for focusing solar energy upon radiation-absorbent means positioned to be impinged by concentrated solar energy from said radiation-concentrating elements, the array being supported on platform means rotatable with respect to the ground about a substantially vertical axis; the platform with the array on it is rotated about the vertical axis in synchronism with the apparent motion of the sun so as to maintain the concentration of solar energy upon the radiation-absorbent means during daylight hours.

It is noted that, in contrast with previously-known systems, the radiation-concentrating elements are not individually rotated to accomplish the desired tracking of the sun, but instead the whole array is rotated as a unit, an arrangement which not only accomplishes the desired tracking of the sun but also makes possible very substantial simplifications and improvements in the practicality of the entire system, as will be described.

The following are among the preferred features of the invention in its more specific embodiments. A liquid bath is provided which at least partly supports the weight of the platform, which may be very large, for example several hundred feet in diameter; preferably, the platform floats on the surface of the liquid bath, which may be an irrigation pond, so that it can be very easily rotated during its tracking motion. In this floating configuration, the entire platform with the radiation-concentrating array thereon can readily be raised or lowered, for purposes described hereinafter, by merely raising or lowering the level of the pond.

Preferably the platform means is laterally positioned and stabilized against unwanted tilt by means of a central column extending into and through the platform, through which column a pair of fluid-carrying conduits extend for transferring a heat-absorbent fluid such as water to and from the radiation-absorbent means, thereby to carry the heat generated at the focus of the reflectors to a position remote from the platform means for subsequent utilization. In a preferred form, the radiation-concentrating elements comprise parallel, trough-like, reflectors of substantially paraboloidal cross-section, having respective lines of focus along which the radiation-absorbent means are located. For example, the radiation-absorbent means may consist of blackened radiation-absorbent conduits or pipes extending along said lines of focus, through which water or some other appropriate heat-absorbent fluid is passed.

Thus, in a preferred embodiment of the invention a plurality of parallel trough-like reflectors are mounted on a floating, rotatable platform, with pipes containing water or the like extending along the respective focus lines of the trough-like reflectors. A central column extending up through the platform serves to position the platform laterally while permitting it to rotate easily in its floating position, and the supply of water to and from the pipes along the reflector focus lines is provided by way of one or more suitable rotating joints associated with the central column. The motive means for rotating the floating platform may be a motor of very low output power, controlled by a clock mechanism to provide the relatively low tracking speed of the platform as it follows the sun. The liquid bath or pond is preferably provided with water-impervious bottom and side walls, and raising the level of the pond raises the platform and the array to expose it fully to the sun's rays, while lowering the pond level drops the platform and the array below the top of the pond walls to provide protection from strong winds when necessary. In a preferred form, pathways are provided between each successive pair of trough-like reflectors for access for servicing of the like. Preferably also, the reflectors are slanted toward the sun, not only to enhance the efficiency of collection of radiant energy but also to facilitate their occasional cleaning by flushing with water.

The above-described arrangement utilizing a floating platform not only permits use of very low tracking drive power and very simple tracking control, but also shields a large portion of the surface area of the pond from direct exposure to the air, thus greatly reducing the rate of evaporation of the water which would otherwise occur, and conserving water for use in the irrigation process.

The system may also include and employ various relatively minor techniques, previously known in the art, for enhancing performance of radiation-concentrating solar energy systems; while the present system lends itself to inclusion of such additional features, they are not necessary parts of the present invention.

BRIEF DESCRIPTION OF FIGURES

Other objects and features of the invention will be more readily understood from a consideration of the following detailed description, taken in connection with the accompanying drawings, in which:

FIG. 3 is a section taken along lines 3—3 of FIG. 2;

FIG. 4 is a section taken along lines 4—4 of FIG. 2, showing the reflector construction in more detail;

FIG. 5 is an enlarged view of a portion of the apparatus of FIG. 3, as viewed along lines 5—5 thereof.

DETAILED DESCRIPTION OF SPECIFIC EMBODIMENTS

Figure 1:
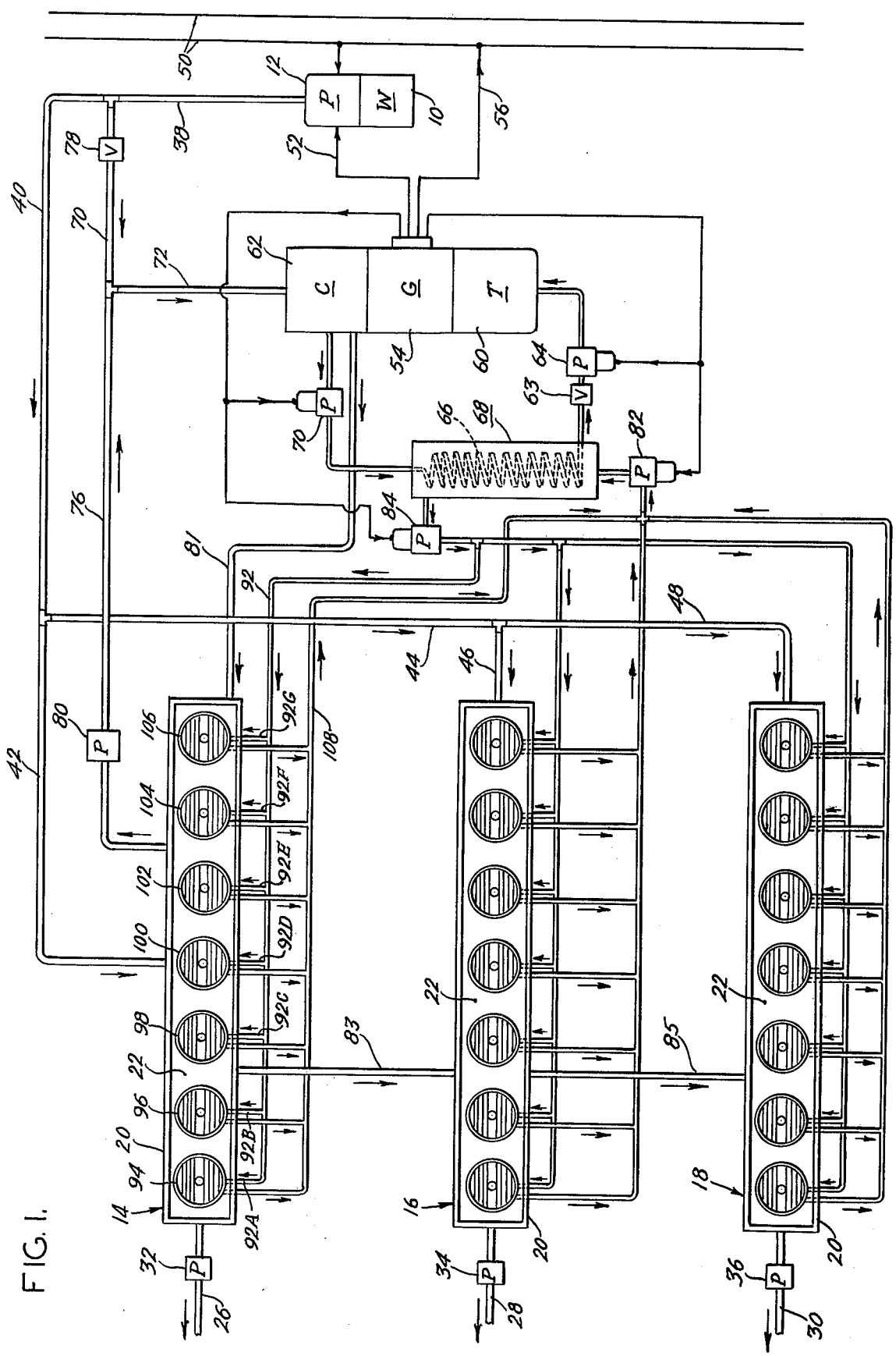
FIG. 1 is a schematic representation of an entire system utilizing applicant's invention, in one of its form, to generate electricity for use in pumping water for irrigation purposes.

Referring now to FIG. 1 which shows schematically an application of the invention to use in a farm irrigation system, an underground waterwell 10 is provided with an electrically-driven pump 12, which pumps water from the well to three water storage ponds 14, 16 and 18, as required for normal irrigation purposes. Each pond may typically be as much as a half mile or more long, and perhaps 200 feet wide, in this embodiment, and each is provided with water-impervious sides such as 20, and bottoms such as 22, which may be of cement. Ponds 14, 16 and 18 are provided with irrigation outlet conduits 26, 28 and 30 respectively, having respective pumps 32, 34 and 36 located therein. Water for pond 14 is supplied from pump 12 by way of pipe sections 38, 40 and 42; to pond 16 by way of pipe sections 38, 40, 44 and 46; and to pond 18 from pipe section 44 by way of pipe section 48.

The electrically-driven motor of pump 12 may be switched between a condition in which it is driven from public-service transmission line 50 (here designated for convenience as a two-wire line) to a condition in which it is driven from an electrical generator output line 52, (shown for convenience as a single line, as are all electrical connections within the farm installation being described). As will be described, electrical generator 54, which supplies output line 52, is itself driven by energy derived from solar radiations, and when so operating may develop power in excess of that required to operate pump 12; such excess power may be delivered to public-service lines 50 over generator output line 56. Also, while the diagram shows only the single pump 12 driven by generator 54, it will be appreciated that there may be a plurality of wells and a plurality of electrically-operated pumps, with all such pumps being driven by generator 54. Other electrical loads on the farm may also be supplied by generator 54 if desired.

From the foregoing it will be appreciated that water from well 10 may be pumped to the storage ponds 14, 16 and 18, and delivered therefrom as required for irrigation purposes by the respective pumps 32, 34 and 36, the storage ponds serving as reservoirs for accommodating the peaks and valleys of demand for irrigation water delivered through irrigation lines 26, 28 and 30.

In this example generator 54 is driven by turbine 60, in association with condenser 62, the combination of turbine, generator and condenser being of well known form. All that is required for the system to operate and generate electricity is for high-temperature steam to be supplied to the turbine through control valve 63 by pump 64, the latter pump being operated by an electrical motor supplied with current from generator 54; in this connection it will be understood that, prior to and during start-up of the turbine-generator condenser system, the various electrical motors shown as being supplied from the output of generator 54 will normally be supplied with power from the public-service lines 50, and then switched over to the generator output when the generator has come up to normal operating condition. These auxiliary connections to the public power lines of 50 are omitted in the interest of clarity.

The heated steam, or other suitable fluid such as freon, for operating the turbine is obtained from a coil 66 in heat-exchanger tank 68, the opposite end of coil 66 being supplied with return water from condenser 62 in response to operation of a pump 70. The latter pump is preferably operated in response to electrical output from generator 54 during normal operating conditions.

In order to be heated appropriately, heat exchanger 66 is in heat exchange relation with a heat-absorbent, heat storage fluid surrounding it in tank 68; water or steam is suitable for this purpose, although other known fluids may be used for this purpose. In this example it will be assumed that water (steam) is used as the heat-absorbent heat storage fluid.

It is also noted that the cooling water for condenser 62 may be supplied from well 10 by way of pipe sections 38, 70 and 72, or alternatively, when desired, the condenser cooling water may be derived from one of the ponds such as pond 14 by way of pipe sections 76 and 72, with valve 79 in line 70 closed and pump 80 in line 76 operating. The warmed cooling water, after leaving the condenser, may be delivered over pipe 81 to one or more of the ponds, for example pond 14. The levels of the ponds may be equalized by pipes 83 and 85. Such delivery of the warm condenser-cooling water to the ponds may be used to prevent freezing of the ponds in cold weather.

Circulation of the heat-absorbent energy storage fluid through tank 68 may be accomplished by a pump 82 at the inlet end of the tank and a pump 84 at the outlet end of the tank, each driven by an electrical motor supplied from generator 54 during normal operating conditions thereof. Thus pump 84 urges the heat-absorbent energy storage fluid from the outlet of tank 68 outward through pipe section 92, and thence through branch lines 92A, 92B, 92C, 92D, 92E, 92F and 92G, to respective solar collection and conversion units 94, 96, 98, 100, 102, 104 and 106, floating on the water in storage pond 20. These units serve to heat the fluid circulated thereto, and the resultant hot fluid is returned thereby through corresponding branch lines to the hot-return line 108, and thence through pump 82 to the tank 68.

Exactly parallel and analogous arrangements are provided for each of the ponds 16 and 18, each of which contains, in this example, seven floating solar energy collection and conversion units, with appropriate piping for supplying the cooled energy storage fluid thereto and for removing therefrom the solar-heated energy storage fluid for return to the heat-exchanger tank 68. Accordingly, the details of these other pond arrangements need not be described in detail.

All of the system of FIG. 1 thus far described, with the exception of the energy collection and conversion units and the pond arrangements associated therewith, may be entirely conventional if desired, and is shown in the detail presented merely to illustrate how applicants' arrangement of solar energy collection and conversion units and associated ponds may be used in one practical application. Furthermore, each of the solar collection and conversion units 94, and each of the ponds such as 14, may be identical with all of the other solar conversion and collection units and ponds shown in the drawings; hence, in the following, there will be shown only the details of one solar energy conversion and collection unit 94 and the associated end of pond 14.

Referring now particularly to the remaining figures 2-8 showing a representative solar energy conversion and collection arrangement 94 and associated pond structure in detail, a shallow, flat-bottomed boat 200 in the shape of a torus floats upon the water 202 in the pond. The central cylinder opening 204 of the boat has affixed thereto a cylindrical sleeve bearing 206, which may be of carbon graphite, and which fits closely but not tightly about a centering cylinder 208 suitably secured to the bottom of the pond. Boat 200 is therefore free to move up and down with the level of the pond water. While the boat is shown as open-topped, it may instead be in the nature of a float or raft made of a material which is itself sufficiently buoyant that it will continue to float with the reflector array and piping on it, even if the boat is punctured or momentarily swamped or filled with rain water.

On the top surface of the bottom of the boat 200 there are supported a plurality of parallel, trough-like reflectors such as 210, 212 of generally paraboloidal cross-section, which in some cases may each be made of a single piece but, since they are typically as much as several hundred feet long, are preferably made in shorter lengths which are butt-ended together with the joints appropriately sealed and made water tight. Preferably, in this example, the reflectors all slope somewhat downwardly toward one side of the boat to facilitate flushing of the reflector surfaces from time to time for cleaning purposes, the flush water being drained into the pond by way of plugs such as 215, or by other means; such tilt is preferably a tilt in the direction toward the sun, thereby improving somewhat the efficiency of collection of solar energy.

As is well known, each such paraboloidal reflector will have a line focus such as 216, 218 in FIG. 4, along which incident solar radiations reflected by the inner surfaces of the reflector will be focused. Along and concentric with each of these focus lines there is provided a heat-absorbent conduit or pipe such as 220, 222, onto each of which the solar radiations are therefore focused by the corresponding respective reflector. It is understood that such focusing and concentrating of solar radiations upon the heat-absorbent pipes occurs effectively only when the solar radiations are arriving in planes parallel to a plane extending through the bottom or vertex of each paraboloid and its line of focus, that is, when a vertical plane through the line focus passes substantially through the apparent position of the sun. This is accomplished by orienting the reflectors so that their cross-sections point directly upward, and rotating the boat to track the apparent daily motion of the sun in such manner that a vertical plane through the line of focus of each reflector passes substantially through the apparent position of the sun during the day. As will be described more fully hereinafter, it is a substantial advantage and convenience of the preferred form of the invention that the boat may be caused to continue to rotate clockwise continuously, day and night, as opposed to being rotationally reciprocated each day.

There are many ways in which the reflectors can be mounted on the boat. In the present embodiment, this is accomplished as follows. A support bed such as 230, 232 may be provided for each reflector, between a pair of corresponding upright longitudinally-extending partition walls such as 234, 236. Each support bed may be of a suitable material, such as foamed plastic as an example, and is provided in its upper surface with a paraboloidal configuration matching the shape of the rear surface of the reflector to be placed therein. These beds may all slope downwardly slightly toward the direction of the sun, so that the reflectors placed therein will have the above-mentioned preferable downward slope also. The interior reflecting surfaces of the reflectors are made as highly reflective as possible, as may be accomplished by providing them with any of the conventionally-used and well-known long-life reflector surface materials.

The solar radiation absorbent pipes such as 220 may be supported at intervals along their length by appropriate supports, such as a pair of horizontal supports 240, 242 extending horizontally between the adjacent partitions on opposite sides of the pipe, and a support 244 extending vertically between the bottom of the boat and the underside of the pipe. These supports may, for example, be located at the end of each section of the reflector, where the supporting bed may be omitted to permit the convenient passage and securing of the support members. The portions of the supports in contact with the pipes should be of a material, such as ceramic, which will not be damaged by the high temperatures produced by the concentrated solar radiations. The radiation-absorbent pipes such as 220 may include known features for enhancing their efficiency, including such measures as covering them with a protective radiation-transparent material beneath which a special radiation-absorbent material is located. In some cases one may also wish to close the open upper ends of the reflectors by light-transmissive material, thereby to protect the reflector surfaces and also to conserve the heat generated in the radiation-absorbing pipes. Also, one may provide a protective covering such as an extendable tarpaulin, normally rolled up adjacent the edge of one reflector but adapted to be pulled open to cover two consecutive reflectors and to be latched in its covering position, particularly during stormy weather or other adverse condition.

In this embodiment one side of each reflector shares a common partition such as 236 with its neighbor on one side, but on its other side the edges of adjacent reflectors are separated by a pair of partition members such as 250, 252, bridged at their top by a walkway such as 256, which enables service personnel or the like to have access to positions such that they need not be more than one reflector-width away from the surface of any of the reflectors, when servicing or other operation is desired.

The arrangement in the present embodiment for providing a flow of the heat-absorbent energy storage fluid from pipe 92A (FIG. 3) through the radiation-absorbing pipes, such as 220, in all of the reflectors, and back to the outlet line 108, may be as follows.

The cooler fluid from line 92A is delivered to a vertical pipe 300 extending through the center of centering cylinder 208, while the "hot" output or return line 108 is supplied from a pipe 302 communicating at its inner end with an annular chamber 304 located within column 208 and concentrically surrounding the exterior of inlet pipe 300. Both inlet pipe 300 and outlet chamber 304 extend upward above column 208 into a rotating joint assembly 320. It should be understood that while column 208 is stationary and fixed to the bottom of the pond, the rotating joint assembly 320 turns with the boat 200 and thus with the solar energy collection and conversion array, and in the present embodiment is in fact caused to so rotate by means of rods 330 and 332 embedded in the inner wall of the boat and extending in vertically sliding engagement through respective openings 334 and 346 in respective ears 338 and 340 secured to the exterior of rotating joint assembly 320.

Rotating joint assembly 320 provides the functions of maintaining fluid-flow communication from inlet pipe 300 to pipe 400, positioned at the top of the rotating joint assembly 320 and on the axis of rotation thereof; and between pipe 402, at the top of the rotating joint assembly but off axis thereof, and the other pipe 302 at the bottom of column 208, and to maintain this fluid-flow communication for all angles of rotation of rotating joint assembly 320 about a vertical axis through its center. Apparatus for accomplishing these formations is known in the art, and one form thereof will now be described in the interest of complete definiteness.

Assembly 320 is provided with a rotating cap 406, to which the above-mentioned ears 338 and 340 are secured, the lower portion 408 of cap 406 being screw-threaded to the upper part at 410 to facilitate assembly and disassembly of the rotating joint structure. The interior of cap 406 is provided with an inner chamber 420 extending concentrically from the inner top surface thereof, but occupying less than the entire diameter of the cap so as to leave an open annular chamber 422 about it. Fixed pipe 300 extends upwardly through the bottom end of chamber 420, and, within chamber 420, is provided with an annular peripheral enlargement 424 the lower face of which bears against a carbon seal member 460. The upper flat surface of enlargement 424 supports a carbon thrust-bearing 500, which is urged downwardly against the upper surfaces of enlargement 424 by a compression spring 502. The arrangement is therefore such that fluid entering pipe 300 can flow upwardly through the portion of chamber 420 within compression spring 502 and thence to pipe 400, without substantial loss of fluid by leakage, despite continued rotation of rotating joint assembly 320.

A somewhat similar arrangement is provided for chamber 304, in that it is provided toward its upper end with a surrounding outwardly-extending peripheral enlargement 560, the lower surface of which bears downwardly against another carbon seal 562 and the upper flat surface of which supports an annular carbon thrust bearing 570 urged downwardly by compression spring 572. Accordingly, fluid-flow communication is maintained, without substantial leakage, from pipe 402 through the annular outer chamber 422 of cap 406, and thence by way of chamber 304 to the lower return pipe 302 as desired, despite continued rotation of the rotating joint assembly 320.

In the present embodiment, the flow of the heat-absorbent energy storage fluid from pipe 400 through the various radiation-absorbent pipes 220 in the various reflectors, and thence back to the pipe 402, may be accomplished as follows.

Figure 2:
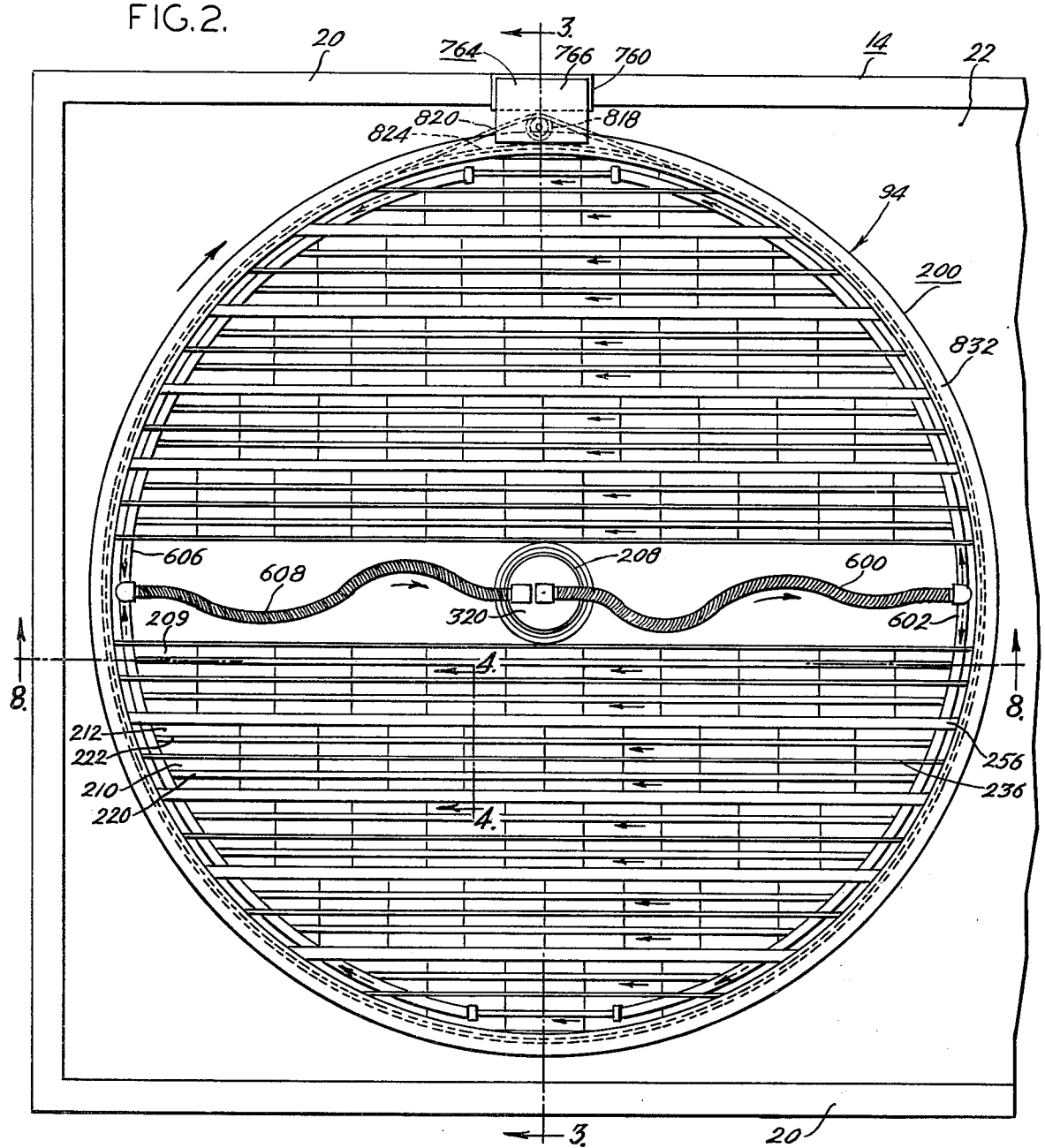
FIG. 2 is a plan view showing one of the floating arrays of reflectors of FIG. 2, in more detail.
Figure 8:
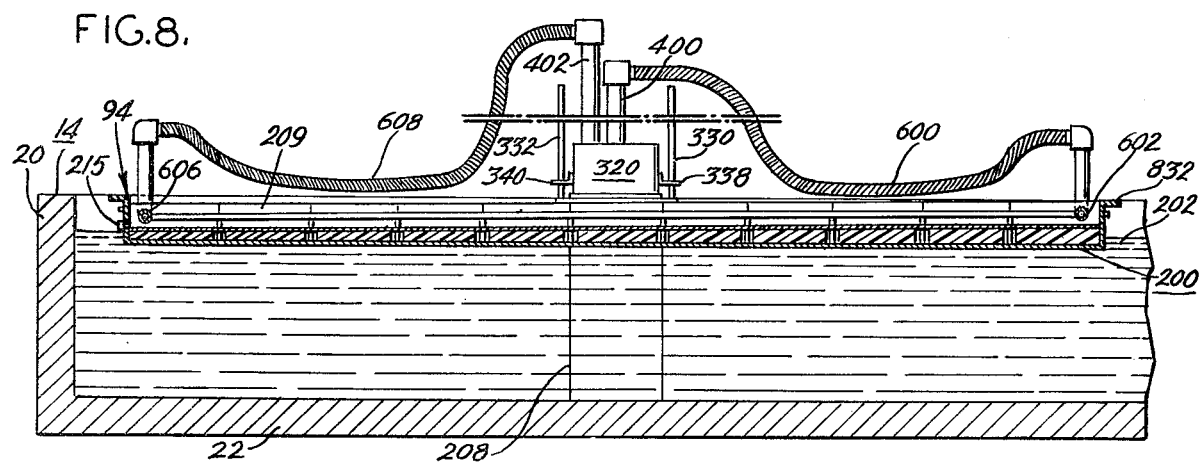
FIG. 8 is a sectional view taken along lines 8—8 of FIG. 2.
Figure 6:
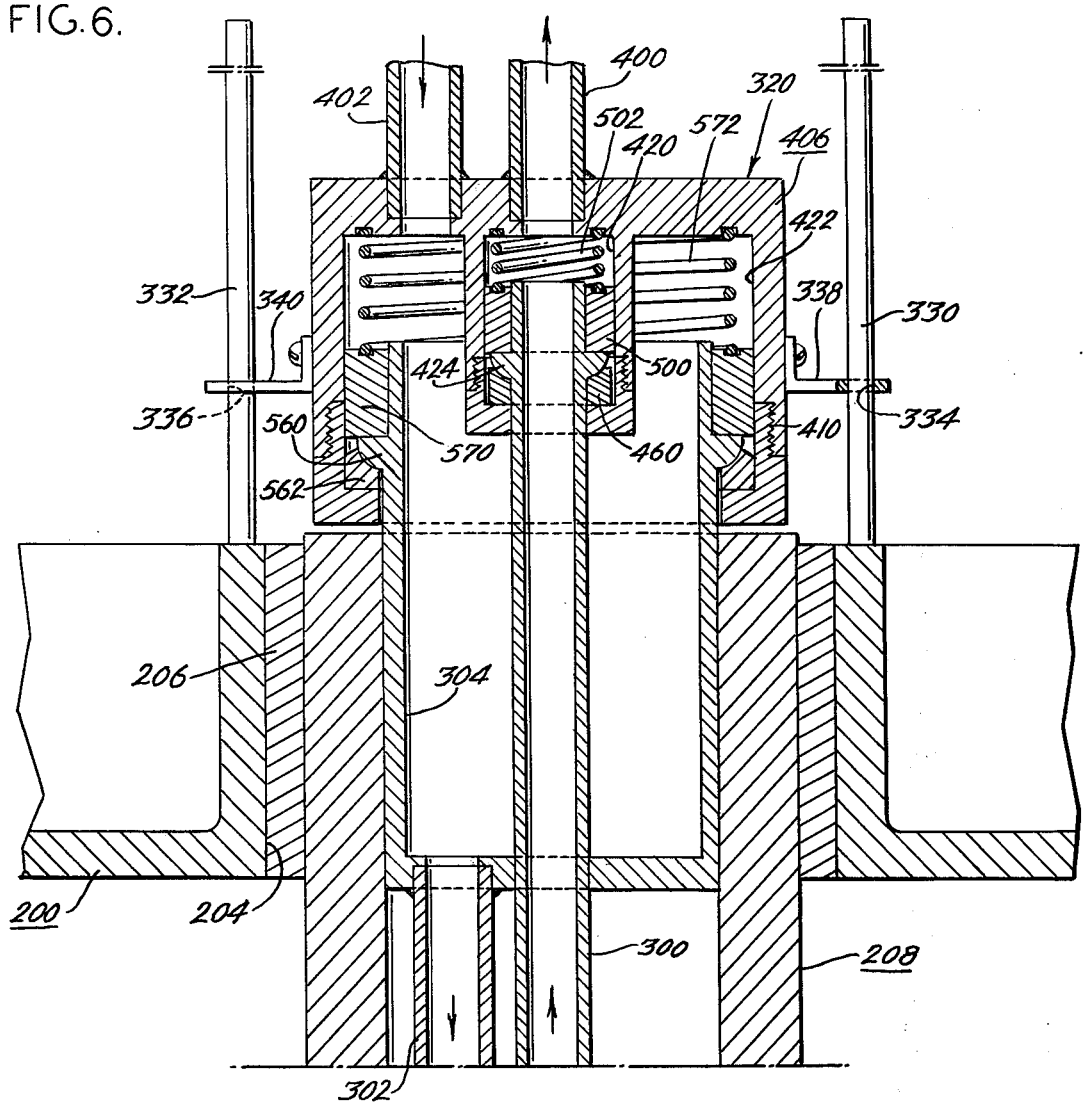
FIG. 6 is a fragmentary enlarged sectional view of a portion of the apparatus of FIG. 3, taken along lines 6—6 thereof, showing the center column arrangement of the apparatus of FIG. 3 in more detail.

As shown particularly in FIGS. 2 and 5, concentric pipe 400 is coupled to a flexible hose 600 leading to an inlet manifold 602 extending nearly halfway around the periphery of the boat 200, so as to feed fluid to an inlet end of each of the radiation-absorbent pipes such as 220. Thus fluid, after flowing through each of the radiation-absorbent pipes, is collected by a similar nearly semi-circular manifold 606 communicating with their opposite ends, and manifold 606 is in turn connected through a flexible hose 608 to pipe 402 at the top of the rotating joint assembly. Both of the hoses 600 and 608 are provided with sufficient slack that they can accomodate the total contemplated upward and downward motion of the boat as the level of the pond changes. These hoses, and to the extent practical all other conduits in this portion of the system but especially those which contain extremely hot fluid, are preferably very heavily insulated to conserve heat energy.

Figure 7:
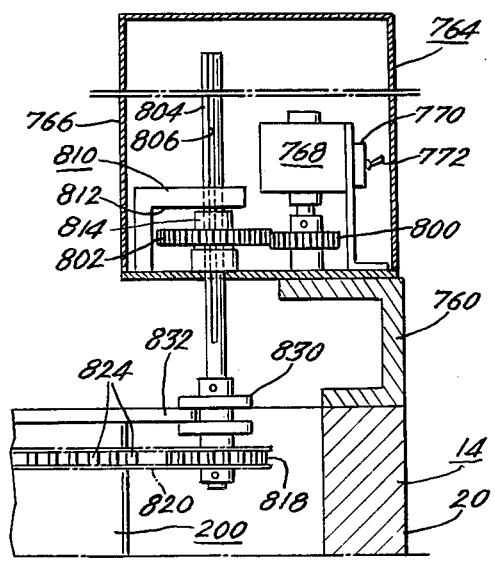
FIG. 7 is an enlarged fragmentary view, partly in section, showing in more detail a suitable arrangement of the rotational drive for tracking the motion of the sun in the apparatus of FIG. 2.

Referring to FIG. 7 showing one illustrative embodiment of apparatus for controlledly rotating the array-bearing boat 200 so as to track the apparent motion of the sun, a bracket 760 mounted on the sidewall of the pond supports a tracking control unit 764, preferably enclosed in a protective cabinet 766 with appropriate access doors and the like. Within cabinet 766 there is mounted an electrical drive motor 768, the direction of rotation and speed of which is controlled by a control box 770. Control box 770 may be provided with a control switch 772, and is supplied with electrical operating supply power by a suitable cable (not shown).

The switch 772 may be of a 5-position type, having a central "off" position, and to the right thereof a standard reverse-speed position and a high reverse-speed position in that order, as well as a standard forward-speed position and a high forward-speed position, to the left of center position, also in that order. The normal position of the switch during operation is the standard forward-speed position, which drives the boat at the proper rate, by conventional means, so as to maintain a vertical plane through any of the line foci of the reflectors in a position to pass through the apparent center of the sun, at least during most daylight hours. The same direction of rotation of the boat is continued during the non-daylight hours, and during the hours when the sun is so low at either horizon as to not offer significant heating effect, in such a manner as again to be in a position to begin proper tracking of the sun when it rises the next morning. The various positions of the switch provide the capability of angularly slewing the reflector array to its proper position of alignment with the sun, for example during startup, or to provide occasional fine resetting of the angular position of the array. The properly aligned condition of the array can be detected visually, by observing when the focused rays reach a maximum on their respective heat-absorbent conduits. With conventional known drive techniques, such manual readjustment of angular position will normally not be required for long periods of time.

The proper rotation of the boat, despite changes in its vertical position with changes in the level of the pond, may be provided as follows and as shown particularly in FIG. 7. The output shaft of motor 768 drives a pinion gear 800 which meshes with the drive gear 802. Drive gear 802 encircles a vertical shaft 804 extending through its center and having a longitudinal keyway 806 therein which mates with an internal key on the inner diameter of the gear 802, whereby rotation of drive gear 802 rotates shaft 804 but permits the latter shaft to slide upwardly and downwardly through the center of the drive gear. Additional support for the shaft 804 and vertical positioning of the gear 802 is provided by a bracket member 810 having an opening closely surrounding the shaft 804, and having a lower surface 812 adjacent the top surface of hub 814 on drive gear 802.

The lowermost end of shaft 804 is provided with a sprocket 818 for driving a timing chain 820 which meshes with sprocket protuberances 824 (see FIGS. 3 and 7) provided on the outer wall of the boat. A pulley-like guide collar 830, secured to shaft 804 slightly above sprocket 818, engages the upper and lower surfaces of a lip 832 on the outer periphery of the boat, so that when the boat moves up and down in response to changes in pond level, the shaft 804 can move up and down correspondingly, while maintaining its desired driving engagement with the sprocket protuberances on the boat and thus maintain the desired control of rotation of the boat.

It is noted that the lip 832 on the boat also provides a circumferential walking pathway which joins the transverse pathways such as 256 mentioned above, thus permitting operating or maintenance personnel to walk to a position adjacent any reflector section where work is to be done or observations made.

Accordingly, in normal operation the motor 768 is effective to rotate the boat so as to maintain appropriate tracking alignment with the sun at least most during daylighthours, while at the same time heat-absorbent energy storage fluid is pumped from the heat-exchange tank 68, through the rotating joint assembly and the various heat-absorbent pipes within the reflectors, and thence back to the heat-exchange tank at a much higher temperature, as is desired to heat the coil 66 in the heat exchange tank and accomplish the desired generation of steam or other thermodynamic working fluid, for operating the turbine 60 and the electrical generator 54. This operation can be continued despite changes in the level of the liquid in the ponds, occurring because of the differences between the amount of water pumped to the ponds from the well 10 and the amount of water extracted from the ponds by the irrigation pipe outlets 26, 28 and 30 during normal water irrigation usage. Also, while the array is much less sensitive to wind loads than, for example, the above-mentioned tower system, and while covering each of the reflectors with a tarpaulin or the like as mentioned above further decreases sensitivity to wind or storm damage, it is also possible in an emergency condition to pump water out the storage ponds into some other reservoir device, thereby lowering the array-carrying boats downward within the protective sides of the ponds.

It is also noted that the boats cover a substantial fraction of the surface of the water in the ponds, and to that extent shade the ponds and prevent exposure of the underlying water to the atmosphere, thereby greatly reducing the rate of evaporation of water from the ponds and conserving the supply of water. In addition, the reflectors on the ponds do not require any land use at all.

The specific manner in which the hot energy storage fluid from the solar collection and conversion units is utilized to accomplish useful work is not a part of the present invention, and it may take forms entirely different from any shown or suggested in the drawings. Also, the exact form of the energy-collection and conversion units, and of the method of support and circulation of fluid to and from them, may vary in many respects from those specifically shown and described. Among the factors especially subject to such variation is the nature of the energy storage fluid employed, and even of the liquid in the ponds which, in widely different applications, might for example be oil.

An important basic aspect of the invention, involving the concept of utilizing an array of solar energy concentration devices having their own respective foci, and rotating all of the reflectors as a unit to track the sun about a vertical axis, may also be applied to widely different types of reflectors and radiation-absorbent elements. Similarly, the method of accomplishing the transfer of the energy storage fluid to and from the rotating arrays may differ widely from that shown; as for example only, instead of hoses connected to the top of the rotating joint, one may utilize in place of each hose a pair of pipe sections joined by a corresponding pair of water-tight rotating joints which therefore will pivot with respect to each other in a fashion to accommodate the up-and-down motion of the boat. Also, while the present system is particularly advantageous in permitting the continued uni-directional rotation of the boat, it is contemplated that the boat may be driven in one direction during daylight hours and returned to its starting position during night-time hours, in which case the supplying and returning of energy storage fuel to and from the radiation collecting and converting units may be accomplished in a simple manner without requiring rotating joints, or using at most a very simple arrangement of same. Of course, mechanisms other than the sprocket-chain arrangement may be employed to accomplish the specified rotation, including gear means, magnetic drives, and others. It is even possible in some instances to "float" the boat by means of an air foil, or by magnetic levitation, or by other means, rather than floating it in a liquid, to provide the desired easy rotation in response to very low driving powers.

Many of the usual refinements of solar energy utilization systems may also be applied to the present system, including such techniques as closing that end of the reflector more remote from the sun with an appropriate mirror for reflecting back onto the heat-absorbing member that portion of the sun's rays which would otherwise be reflected out of the remote end of the reflector. Known advanced techniques of insulation, surface-protection and fluid circulation may be applied where appropriate.

Thus while the invention has been described with particular reference to specific embodiments in the interest of complete definiteness, it will be understood that it may be embodied in a variety of forms diverse from those specifically shown and described, without departing from the spirit and scope of the invention as defined by the appended claims.

What is claimed is:

1. Apparatus for the collection and conversion of solar energy, comprising:

an array of parallelly-disposed trough-like radiation-focusing elements exposed to solar radiation for concentrating said solar radiation, each of said radiation-focusing elements having a line vertex and a line focus extending parallel to each other longitudinally thereof and configured such that solar radiation incident on each said radiation-focusing element and arriving along a plane parallel to a reference plane through said line vertex and said line focus thereof is focused onto said line focus;

solar-radiation absorbent means positioned along each said line focus to be impinged by said concentrated solar radiation from said radiation-focusing elements;

common platform means supporting said elements of said array with said reference plane of each said radiation-focusing element extending substantially vertically, said platform being rotatable with respect to the ground about a substantially vertical axis; and means for rotating said platform means with said array thereon, about said substantially vertical axis, in synchronism with the apparent daytime motion of the sun to maintain said reference plane of each said radiation-focusing element in a substantially vertical position passing through the apparent position of the sun during daylight hours.

2. The apparatus of claim 1, comprising a fluid at least partly supporting the weight of said platform means.

3. The apparatus of claim 2, wherein said fluid comprises a pond of water.

4. The apparatus of claim 3, wherein said pond comprises structural sidewalls and bottom for retaining said water in said pond.

5. The apparatus of claim 2, wherein said platform means floats on said fluid.

6. The apparatus of claim 1, comprising a heat-absorbent fluid energy storage fluid in heat-exchange relation with said heat-absorbent means for absorbing heat produced by said solar-radiation absorbent means.

7. The apparatus of claim 1, wherein said elements of said array comprise a plurality of parallel trough-like radiation reflectors of substantially paraboloidal cross-section.

8. The apparatus of claim 5, comprising means for raising and lowering the level of said pond to raise and lower said platform means.

9. The apparatus of claim 6, comprising means for conveying said energy-storage fluid between said rotatable platform means and a fixed position adjacent thereto, as said platform means rotates.

10. The apparatus of claim 9, comprising a column mounted to the ground and extending to said platform means for stabilizing said platform means against lateral motion and against tilting.

11. The apparatus of claim 10, wherein said platform means is toroidal in shape and said column extends along an axis through the center opening of said platform means, said platform means being vertically movable with respect to said column.

12. The apparatus of claim 11, wherein said means for conveying fluid between said rotatable platform means and a fixed position adjacent thereto comprises fluid conduit means extending through said column.

13. In combination with a farm irrigation system comprising pump means for pumping irrigation water and water reservoir means for storing irrigation water, and an energy source for operating said pump means, the improvement wherein said energy source comprises at least one array of solar radiation reflectors for focusing solar radiations in the region of the foci of said reflectors, radiation-absorbent means positioned at said foci for developing thermal energy in response to said focused solar radiations, common platform means supporting said reflectors and said radiation-absorbent means, means for rotating said platform means about a substantially vertical axis to cause said reflectors to track the apparent daytime motion of the sun and maintain said solar radiations focused on said radiation-absorbent means, energy conversion means responsive to thermal energy of high temperature for producing useful work, and means for conveying to said energy conversion means said thermal energy developed by said radiation-absorbent means, wherein each of said reflectors is of paraboloidal trough-like form having a reference plane such that solar radiation incident on said each reflector arriving in a plane parallel to said reference plane is focused onto said energy-absorbent means, said reference plane extending vertically and through the apparent daytime position of the sun as said platform means is rotated.

14. The system of claim 13, wherein said platform means is floating upon water in said reservoir means.

15. The system of claim 14, comprising column means extending from the earth to said platform means for stabilizing it against tilt and against lateral motion.

16. In combination with a farm irrigation system comprising pump means for pumping irrigation water and water reservoir means for storing irrigation water, and an energy source for operating said pump means, the improvement wherein said energy source comprises at least one array of solar radiation reflectors for focusing solar radiations in the region of the foci of said reflectors, radiation-absorbent means positioned at said foci for developing thermal energy in response to said focused solar radiations, common platform means supporting said reflectors and said radiation-absorbent means, means for rotating said platform means about a substantially vertical axis to cause said reflectors to track the apparent daytime motion of the sun and maintain said solar radiations focused on said radiation-absorbent means, energy conversion means responsive to thermal energy of high temperature for producing useful work, and means for conveying to said energy conversion means said thermal energy developed by said radiation-absorbent means;
   wherein said platform means comprises a toroidal boat floating upon water in said reservoir means, said energy source also comprising column means extending from the earth to said platform means for stabilizing it against tilt and against lateral motion, said column means extending slidably into the opening in the center of said boat, whereby said boat can rise and fall in accordance with the changes in the level of said reservoir water.

17. The system of claim 16, wherein said means for rotating said platform means comprises rim drive means for applying rotational torques to the outer periphery of said platform means.

18. A solar radiation collection and conversion system, comprising:
   a contained body of water;
   toroidal boat means floating on said body of water;
   an array of parallel trough-like reflectors of substantially paraboloidal cross-section supported on said boat means, the line focus and the line vertex of each of said reflectors lying in a common vertical plane;
   a guide column extending vertically through the center of said boat means, said boat means being vertically movable along said guide means in response to changes in the level of said water;
   means for passing a heat-absorbent fluid along said foci so as to be heated in response to said solar radiations; and
   means for rotating said boat means about a vertical axis so that each said plane passes substantially through the apparent center of the sun during a substantial part of the daylight hours.

19. The system of claim 18, comprising means for converting thermal energy to useful work, and means for transmitting said heated fluid into heat-exchange relation with said thermal-energy converting means.

20. The system of claim 19, wherein said thermal-energy converting means comprises a heat engine.

21. The system of claim 20, comprising means for recirculating said fluid along said foci to re-heat it after its delivery into heat-exchange relation with said heat engine.

22. The system of claim 21, wherein said means for transmitting said fluid and said means for recirculating said fluid both extend through said column.

* * * * *